United States Patent
Booij et al.

(10) Patent No.: US 10,876,712 B2
(45) Date of Patent: Dec. 29, 2020

(54) COMFORT OF OUTDOOR LUMINAIRES DUE TO PHYLLOTACTIC ARRANGEMENT OF LED SOURCES

(71) Applicant: SIGNIFY HOLDING B.V., Eindhoven (NL)

(72) Inventors: Silvia Maria Booij, Eindhoven (NL); Norbertus Antonius Maria Sweegers, Lierop (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/642,470

(22) PCT Filed: Sep. 6, 2018

(86) PCT No.: PCT/EP2018/073924
§ 371 (c)(1),
(2) Date: Feb. 27, 2020

(87) PCT Pub. No.: WO2019/048511
PCT Pub. Date: Mar. 14, 2019

(65) Prior Publication Data
US 2020/0263854 A1   Aug. 20, 2020

(30) Foreign Application Priority Data
Sep. 7, 2017 (EP) .................................... 17189888

(51) Int. Cl.
*F21V 5/00* (2018.01)
*F21S 41/24* (2018.01)
(Continued)

(52) U.S. Cl.
CPC .............. *F21V 13/04* (2013.01); *F21S 8/086* (2013.01); *F21S 43/14* (2018.01); *F21S 43/237* (2018.01);
(Continued)

(58) Field of Classification Search
CPC ........ F21V 13/04; F21V 7/0083; F21V 5/048; F21V 5/007; F21V 7/04; F21S 8/086;
(Continued)

(56) References Cited

U.S. PATENT DOCUMENTS

| 4,811,172 A | 3/1989 | Davenport et al. |
| 8,356,916 B2 * | 1/2013 | Gordin .................. F21V 7/0083 362/249.02 |

(Continued)

FOREIGN PATENT DOCUMENTS

| CA | 2425474 A1 | 7/2003 |
| DE | 3942450 A1 | 2/1991 |

(Continued)

OTHER PUBLICATIONS

Ducenti (Lux Phyllotaxis), Designed by Evil Genius Labs, https://www.tindie.com/products/jasoncoon/ducenti-lux-phyllotaxis/.

*Primary Examiner* — Tracie Y Green
(74) *Attorney, Agent, or Firm* — Daniel J. Piotrowski

(57) ABSTRACT

The invention provides an outdoor luminaire (100) comprising: —a plurality of lighting devices (10), each lighting device (10) configured to provide lighting device light (11) and each lighting device (10) comprising at least a light source (13); —a plurality of beam shaping optics (20), each beam shaping optics (20) configured to receive lighting device light (11) of one of the lighting devices (10) and configured to beam shape the lighting device light (11) into a beam (12) of lighting device light (11); wherein the outdoor luminaire (100) is configured to provide a beam (112) of luminaire light (101) comprising the beams (12) of lighting device light (11); and wherein the beam shaping optics (20) are configured in an arrangement (120) which is random, phyllotactic or a combination thereof.

14 Claims, 4 Drawing Sheets

(51) Int. Cl.

| | |
|---|---|
| *F21S 43/235* | (2018.01) |
| *F21S 43/251* | (2018.01) |
| *F21V 13/04* | (2006.01) |
| *F21V 7/04* | (2006.01) |
| *F21V 5/04* | (2006.01) |
| *F21V 7/00* | (2006.01) |
| *F21V 8/00* | (2006.01) |
| *F21S 43/237* | (2018.01) |
| *F21S 43/20* | (2018.01) |
| *F21S 43/40* | (2018.01) |
| *F21S 43/14* | (2018.01) |
| *F21S 8/08* | (2006.01) |
| *F21W 131/103* | (2006.01) |
| *F21Y 105/12* | (2016.01) |
| *F21Y 115/10* | (2016.01) |

(52) U.S. Cl.
CPC ............. *F21S 43/26* (2018.01); *F21S 43/40* (2018.01); *F21V 5/007* (2013.01); *F21V 5/048* (2013.01); *F21V 7/0083* (2013.01); *F21V 7/04* (2013.01); *G02B 6/0008* (2013.01); *F21W 2131/103* (2013.01); *F21Y 2105/12* (2016.08); *F21Y 2115/10* (2016.08)

(58) Field of Classification Search
CPC .......... F21S 43/14; F21S 43/237; F21S 43/40; F21S 43/26; G02B 6/0008; F21Y 2105/12; F21Y 2115/10; F21W 2131/103
See application file for complete search history.

(56) References Cited

U.S. PATENT DOCUMENTS

| | | | |
|---|---|---|---|
| 10,728,968 B2 * | 7/2020 | Sweegers | ............... H05B 45/00 |
| 2006/0087866 A1 | 4/2006 | Ng et al. | |
| 2011/0222307 A1 | 9/2011 | Kong | |
| 2012/0212965 A1 | 8/2012 | Nakamura et al. | |
| 2016/0146450 A1 | 5/2016 | Benhamou | |
| 2019/0032891 A1 * | 1/2019 | Dijken | .................... F21V 11/14 |
| 2019/0272456 A1 * | 9/2019 | Roach | ...................... H01L 33/62 |

FOREIGN PATENT DOCUMENTS

| | | |
|---|---|---|
| DE | 102010023956 A1 | 12/2011 |
| EP | 2881653 A1 | 6/2015 |
| GB | 2362207 A | 11/2001 |
| JP | 5102525 A | 4/1993 |
| JP | 10039793 A | 2/1998 |
| JP | 2007123175 A | 5/2007 |
| WO | 2004051705 A2 | 6/2004 |
| WO | 2005050087 A1 | 6/2005 |
| WO | 2012167800 A1 | 12/2012 |
| WO | 2013009221 A2 | 1/2013 |

* cited by examiner

COMFORT OF OUTDOOR LUMINAIRES DUE TO PHYLLOTACTIC ARRANGEMENT OF LED SOURCES

CROSS-REFERENCE TO PRIOR APPLICATIONS

This application is the U.S. National Phase application under 35 U.S.C. § 371 of International Application No. PCT/EP2018/073924, filed on Sep. 6, 2018, which claims the benefit European Patent Application No. 17189888.5, filed on Sep. 7, 2017. These applications are hereby incorporated by reference herein.

FIELD OF THE INVENTION

The invention relates to a luminaire, especially an outdoor luminaire, as well as to an arrangement of such (outdoor) luminaire.

BACKGROUND OF THE INVENTION

The specific arrangement of light emitting diodes is known in the art. GB2362207A, for instance, describes automated lighting having a source of light formed by a plurality of white light emitting diodes. The diodes, preferably, each have blue, red and green guns. The automated lighting preferably further comprises a device for changing a beam of light produced by the diodes. The plurality of white light emitting diodes are arranged in a spirally configuration.

WO 2005/050087 A1 discloses a lamp which comprises at least one light source and a transparent light-emerging element which is disposed upstream of the light source relative to the direction of radiation. At least one subarea of the surface of the light-emerging element, which faces away from the light source, is provided with a plurality of statistically distributed lens-shaped protrusions or spherical recesses.

SUMMARY OF THE INVENTION

In outdoor lighting applications, individual LEDs in the light source can be easily recognized. From studies, it appeared that discomfort glare is dependent on the homogeneity and contrast appearing from the light source which consists of orthogonally arranged LEDs (rows and columns). In outdoor lighting, most new luminaires contain LEDs. Some luminaires, mostly in pedestrian areas, appear completely diffuse, these luminaires usually emit light in an area close to the device itself, and they typically do not generate a well-defined beam. In motorway applications, strict demands are present on the beam shape; therefore the covers of the luminaires are completely transparent, resulting in direct visibility of the LEDs and their optics. The regular arrangement of light sources appears to have an attention attracting effect, which may be (also) undesirable. It appears that people tend to complain about the glare and the pixilation of LED luminaires.

Hence, it is an aspect of the invention to provide an alternative luminaire, especially for outdoor lighting, which preferably further at least partly obviates one or more of above-described drawbacks. The present invention may have as object to overcome or ameliorate at least one of the disadvantages of the prior art, or to provide a useful alternative.

Herein, it is proposed to reduce the glare discomfort by introducing alternative arrangements of the LEDs like "organic" and "random" LED arrangements, instead of orthogonal arrangement of the individual LEDs. Hence, in embodiments the LEDs may be placed on the PCB in a non-orthogonal arrangement. In this way when one approaches the luminaire one does not see rows of LEDs that are lined up perfectly. One of the arrangements could be a phyllotactic one, which is based on the Fibonacci sequence, or "golden ratio", an arrangement that often occurs in nature. A big advantage of this arrangement is that the arrangement does not consist of straight lines of LEDs in any direction, and the arrangement is not a messy, random one either. It is a very natural arrangement (as it occurs in nature in sunflowers, dandelions, pine cones etc.). A random grid could be an alternative option, but a phyllotactic one seems most appreciated. Since the number of LEDs and the brightness per LED have not changed the measurable glare may not have changed, but a glare discomfort due to a regular arrangement may be essentially absent. Alternatively, if in embodiments the PCB has the LEDs placed in an orthogonal grid, then an optical device, especially an optical fiber, can be used to image the LEDs from their original location to the new location on a phyllotactic grid. Imaging the sources to a different plane at different (x,y) coordinates can be done by curved light-guides for example.

Therefore, in a first aspect the invention provides a luminaire, which can especially be used for outdoor applications (and therefore herein also indicated as "outdoor luminaire"), comprising: (i) a plurality of lighting devices, each lighting device configured to provide lighting device light and each lighting device comprising at least a light source, especially a solid state light source, such as one or more light emitting diode(s) (LED(s)); (ii) a plurality of beam shaping optics, each beam shaping optics configured to receive lighting device light of one of the lighting devices and configured to beam shape the lighting device light into a beam of lighting device light; wherein the outdoor luminaire is configured to provide a beam of luminaire light comprising the beams of lighting device light; and wherein the beam shaping optics are configured in an arrangement which is applied in a phyllotactic pattern or a combination of a phyllotactic pattern and random pattern; and wherein any straight line does not cross more than three adjacent beam shaping optics. The luminaire can especially be used for street lighting. Hence, in embodiments the luminaire is a street lighting luminaire.

With such luminaire, it is possible to provide lighting, such as street lighting, without the possible distraction due to a regular pattern. Hence, with such luminaire it may be possible to provide the right beam shape, due to the presence of the beam shaping optics, with the required glare conditions, such as for (some) outdoor lighting, but without the so-called glare discomfort due to the regularly arranged light sources.

As indicated above, the luminaire comprises a plurality of lighting devices. Herein, the term "plurality of lighting devices" may especially refer to at least 16, such as at least 24, like at least 28, such as at least 32, like at least 36 lighting devices, such as 24-800, like 48-600 lighting devices. Such lighting devices may in embodiments be configured to provide essentially the same lighting device light, i.e. lighting device light with essentially the same spectral distributions and especially also essentially the same angular distributions of the lighting device light.

The light of each lighting device is beam shaped with the beam shaping optics; see also below. Each lighting device configured to provide lighting device light. This light may be white light, or this light may be colored light. Optionally, the lighting device is color tunable. Alternatively or additionally, different lighting devices are configured or able to provide different spectral distributions. Hence, in embodiments the spectral distribution of the luminaire light may be controllable. In embodiments wherein the spectral distribution and/or intensity of one or more lighting devices light is controllable, or wherein individual lighting devices (or subsets of one or more lighting devices) are controllable, or wherein the spectral distribution (and/or intensity) of the luminaire light is controllable, the luminaire may also comprise or may be functionally coupled to a control system.

Hence, in an aspect the invention also provides a combination of a luminaire and a control system, configured to control the luminaire (especially one or more of the intensity of the luminaire light and the spectral distribution of the luminaire light). Further, the luminaire may comprise a sensor, such as a daylight sensor and/or a presence (or movement) sensor and/or the control system may be functionally coupled to such sensor. In such embodiments, the control system may be configured to control the luminaire (also) as function of a sensor signal. Alternatively or additionally, the luminaire may comprise a user interface (UI), such as a graphical user interface (GUI) and/or the control system may be functionally coupled to such sensor. In such embodiments, the control system may be configured to control the luminaire (also) as function of an input (by a user) via the user interface.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior.

Each lighting device comprises at least a light source, especially a solid state light source, such as one or more light emitting diode(s) (LED(s)). The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources. The lighting device may thus comprise a single light source or a plurality of light sources. The light sources can e.g. be related, e.g. controlled as a set and/or on the same PCB, or can be unrelated, which can be the case when individually controlled and/or when on different PCBs.

Further, as indicated above, the luminaire comprises a plurality of beam shaping optics. The lighting devices and beam shaping optics are configured such that the each beam shaping optics receives light from especially essentially a single lighting device. The light received from other lighting devices may be less than 20%, preferably less than 10%, even more preferable less than 5%, of the total lighting device light received. In this way, beam shape control can be controlled well. Hence, each beam shaping optics is configured to receive lighting device light of one of the lighting devices and configured to beam shape the lighting device light into a beam of lighting device light. As indicated above, a single lighting device may comprise a single light source, but may also comprise a plurality of (solid state) light sources. In embodiments, the beam shaping optics are light transmissive optics, such as a lens or a total internal reflection element, like a reflector of a transparent material. The term "light transmissive optics" herein refers light through which the lighting device propagates (and is beam shaped) such as especially a lens and/or a collimator. Hence, in specific embodiments the beam shaping optics comprise lenses. Alternatively or additionally, the beam shaping optics comprises total internal reflective optics or reflective optics, which are herein both indicated as reflector. Hence, also a (hollow) reflector may be used, such as a collimator. Therefore, especially the beam shaping optics may comprise one or more of lenses and reflectors. A single beam shaping optic may thus include a lens or a reflector or both, and optionally also further optics. In general, the luminaire will comprise a plurality of lenses and/or a plurality of reflectors.

The term "material" herein, in general refers to a solid material. For instance, the window (see also below) and/or the light transmissive optics, such as a TIR collimator, may comprise a glass, a ceramic, or a polymeric material.

The lighting devices may have optical axis. Also the light transmissive optics may have optical axis. Intermediate optics between the lighting devices and the beam shaping optics are not excluded (see also below). In general, the lighting devices and the beam shaping optics will be configured such that the optical axis essentially coincide. The beam shaping optics may have cross-sectional areas in the range of 0.25 mm$^2$-16 cm$^2$, such as 1-100 mm$^2$. For instance, the beam shaping optics may comprise total internal reflection optics with an end window (light exit window of the optics) of 16 cm$^2$, or smaller. The term "cross-sectional areas" especially refers to the largest area in cross-section to the beam shaping optics, which cross-section is perpendicular to the optical axis of the beam shaping optics.

The light transmissive optics shape the beam of the lighting devices into beams that are suitable for an intended application, such as street lighting. In this way, the beam of light emanating from the luminaire has the desired properties in terms of beam shape. Therefore, the outdoor luminaire is configured to provide a beam of luminaire light comprising the beams of lighting device light.

As indicated above, the beam shaping optics are especially configured in an arrangement which is random, phyllotactic or a combination thereof. Especially, the luminaire comprises a density of (lighting devices and) beam shaping optics of at least 1/16 cm$^2$ beam shaping optics, such as at least 1/4 cm$^2$, and especially at maximum 1/1 mm$^2$, such as at maximum 1/25 mm$^2$. The area to which is referred may be a virtual flat face through all beam shaping optics, but such face may also include one or more curvatures. Hence, the density of beam shaping optics may be at minimum 1 per 16 cm$^2$, such as at maximum 1 per 4 cm$^2$, which may e.g. be the case with relative large optics. In general, there may be also a maximum density, such as at maximum at least 1 optics per 1 mm², which would imply relative small optics, like at maximum 1 optics per 25 mm².

Optics may essentially be configured directly adjacent, as far as this is possible with a random or phyllotactic arrangement. In general, there will be some distance between the optics. Lighting devices will in general be configured at a minimum distance from each other, such as at least about half the equivalent spherical diameter of the lighting device, even more especially at least about the equivalent spherical diameter of the lighting device (see also below). Especially in the case of random structures it may be useful to maintain such conditions.

A random pattern may also be chosen. Especially, in such random pattern there are no subsets of adjacent beam shaping optics of more than three beam shaping optics configured in a straight line (along the virtual face).

Alternatively or additionally, a phyllotactic pattern may be applied. Especially, the pattern is essentially phyllotactic. Therefore, in embodiments the arrangement of the plurality of beam shaping optics is a phyllotactic arrangement. The phyllotactic pattern may be described based on the pattern of florets (or seeds) in a sunflower head. These may be based on the formula: $\varphi=n*137.5°$, $r=c*\sqrt{n}$, wherein n is the ordering number of a floret, counting outward from the center. This is the reverse of floret age in a real plant, $\varphi$ is the angle between a reference direction and the position vector of the $n^{th}$ floret in a polar coordinate system originating at the center of the capitulum. It follows that the divergence angle between the position vectors of any two successive florets is constant, $\alpha=137.5°$, and r is the distance between the center of the capitulum and the center of the nth floret, given a constant scaling parameter c. Translating this to the luminaire, n may be selected from the range of e.g. 24-800.

In embodiments, there may be n arrangements, wherein n is at least 2, wherein e.g. a higher number arrangement is an arrangement of a lower number arrangement, such as a second arrangement being an arrangement of second arrangements. The lower numbered arrangement may be all the same, or may be different. Especially, n is 2, though n may also be 3 or larger. For instance, a (second) regular arrangement of a plurality of (essentially identical) (first) phyllotactic arrangements may be provided. Alternatively, a (second) phyllotactic arrangement of a plurality of (essentially identical) (first) regular arrangements may be provided. Hence, e.g. a super arrangement (or structure), which may be regular, of phyllotactic arrangements may be provided. When there is a (second) arrangement of (first) arrangements, the former arrangement and/or one or more of the latter arrangements are random or phyllotactic. Especially, when a (second) arrangement of (first) arrangements is provided, the latter are all random or phyllotactic, especially all phyllotactic.

As the beam shaping optics are configured in the above indicated pattern(s) it may be most easy when also the lighting devices are configured in such pattern. Therefore, in specific embodiments the plurality of lighting devices are configured in an arrangement which is random, phyllotactic or a combination thereof. Hence, especially in such embodiments the lighting devices and beam shaping optics are configured in the same pattern, such as with same heart-to-heart distances between the lighting device and the corresponding beam shaping optics. Hence, a PCB (printed circuit board) may be provided with a plurality of lighting devices having an arrangement which is random, phyllotactic or a combination thereof.

However, in embodiments also a PCB (printed circuit board) may be provided with a plurality of lighting devices having an arrangement which is regular. In such embodiments, additional optics, especially light guides, such as optical fibers, may be applied to optically couple the regular arranged lighting devices with the respective irregular and/or phyllotactic arranged beam shaping optics. Therefore, in embodiments the plurality of lighting devices are configured in an arrangement which is regular, wherein the outdoor luminaire further comprises a plurality of optical fibers for guiding the lighting device light of the lighting devices to the respective beam shaping optics.

For instance, for protective reasons, a window may be applied downstream of the beam shaping optics. The term "window" refers to a light transmissive material through which the light may be transmitted. Such window is especially essentially transparent, and does thus essentially not influence the beam shape. Therefore, in embodiments the luminaire may further comprise a light transparent window configured downstream of the plurality of beam shaping optics.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In specific embodiments, the beam shaping optics and such window may at least partly be integrated, such as a window with (micro)lens structures. Therefore, in embodiments the (outdoor) luminaire may further comprise a light transparent window configured downstream of the plurality of lighting devices, wherein the plurality of beam shaping optics are at least partly comprised by the light transparent window.

Further, it appears beneficial when the luminaire does not show strong differences between light and dark areas, i.e. light emitting surfaces of the lighting devices or beam shaping optics and the areas in between. Therefore, in embodiments the luminaire may further comprise one or more of first interspaces between adjacent lighting devices and second interspaces between adjacent beam shaping optics, wherein the first interspaces or the second interspaces comprise light reflective material configured to reflect visible light in a direction away from the outdoor luminaire. Especially, the reflective material is essentially white, such as a Teflon coating or an alumina coating, etc.

Likewise, the sharp distinction between the luminaire and its environment (in the dark) may be less desirable and add to non-useful distraction. Therefore, in embodiments the luminaire defines a light emitting area from which the beam of luminaire light emanates, and wherein the plurality of lighting devices are configured to provide lighting device light with different intensities, with higher intensities in a central part of the light emitting area and with lower intensities in a peripheral part of the light emitting area. Hence, this may be achieved with arranging less powerful lighting devices at the peripheral part and more powerful lighting devices at a central part.

However, this may also be achieved with a control system (see also above). Hence, in embodiments the luminaire (also) defines a light emitting area from which the beam of luminaire light emanates, the outdoor luminaire further comprising a control system or being functionally coupled to a control system, wherein the control system is configured to control in a control mode the lighting devices to provide lighting device light with different intensities, with higher intensities in a central part of the light emitting area and with lower intensities in a peripheral part of the light emitting area. The term "in a control mode" indicates that there is at least one setting with essentially fixed conditions. In general, such control mode is the control mode wherein the system is in use. Hence, the term "control mode" may also refer to an "on state". Would the system be controllable, then there may be different "on states". In such embodiment, there may be a first control mode, a second control mode, and optionally further control mode. This may e.g. be the case for systems which can be in use with (continuously) variable conditions. Here, the term "condition" may e.g. refer to intensity of the light source light.

Especially, a gradient in intensity may be provided, such as with at least two intermediate intensity values between no light of the lighting luminaire (i.e. directly besides the lighting luminaire in the dark) and the one or more lighting devices in the central part at maximum intensity.

For outdoor lighting, such as especially street lighting, the beam shape may be relevant, as glare should be strictly defined, such as according to national or international regulations. In specific embodiments the plurality of lighting devices and the plurality of beam shaping optics are configured to provide the beam of luminaire light having a beam angle ($\gamma$) in the range of 90-140° within a cross-sectional plane of the beam of luminaire light, which cross-sectional plane of the beam of luminaire light also comprises an optical axis (O) of the outdoor luminaire, with at least 75% of the intensity of the luminaire light within this beam angle ($\gamma$). Here, the term "beam angle" may also refer to opening angle. The cross-sectional plane refers to a plane through the beam, which plane includes the optical axis. The opening angle may differ for different planes. Especially, there is no plane with a beam angle larger than 140°.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

Especially, however, the luminaire is used for outdoor lighting or lighting of large indoor areas.

Therefore, in yet a further aspect, the invention also provides an arrangement of an (outdoor) luminaire as defined herein, configured to illuminate with the beam of luminaire light an area below the luminaire. The arrangement may further comprise a control system, functionally coupled to the luminaire for controlling the luminaire.

The arrangement may e.g. comprise one or more street light elements, each comprising one or more luminaires. Here, the term "street light element" may refer to a street light, a light pole, a lamppost, a street lamp, a light standard, or a lamp standard, and in general to any raised source of light, especially on the edge of a street. The term "street light element" may also refer to a lighting unit that is integrated in road barriers, tunnels, including tunnel walls or tunnel ceilings, that are used for street lighting. Herein, a plurality of poles with catenary lighting is indicated as a specific embodiment of a plurality of street light elements. The street light element may be configured at an edge of a street, such as a roadside, but may also be configured at median of a highway. The street light element may also be configured over a street. Herein, the term "street" may refer to a road, a track, a path, a way, a motorway, a highway, etc. The term street may refer to a street within the built environment or between built environments, etc. In general, the lighting system will include a plurality of street light elements. The term "street" may also refer to a ramp or exit to e.g. a highway or road, etc. In specific embodiments, the term "street" may also refer to one or more of a parking lot, a pedestrian path, a cycle path, etc. In yet further specific embodiments, the term "street" may also refer to a waterway (with the invention especially being used warn a ship at the wrong place or moving in the wrong direction). The term "street" may also refer to a part of a street, such as one or more lanes of a street, or a part of one or more lanes.

Here, the luminaire is especially described in relation to its use, i.e. described as being for instance arranged and installed at a street for use as street lighting. However, the invention is not limited to a configuration in use only. For instance, the invention also provides the luminaire or street light elements per se, i.e. not yet installed but configured to be installed at a street.

Each street light element comprises a luminaire configured for lighting a street with lighting unit light. Especially, such luminaire or street light element is configured to provide (in use) street light that complies with street light regulations defined by the relevant national government or international organization (where the lighting system is applied).

The luminaire may also be used for automotive lighting. Therefore, the invention also provides the use of the luminaire as defined herein in automotive lighting. The term "automotive lighting" especially refers to lighting of motorized vehicles, especially motorized wheeled vehicles, like cars, busses, coaches, trucks, motors, etc. The luminaire may be used for forward illumination, such as in headlamps or in auxiliary lamps. The luminaire may be used in conspicuity, signal and identification lights, such as in front light applications, lateral light applications, or rear light applications. In specific embodiments, the invention also provides the use of the luminaire in a rear light. For instance, rear lights may include rear position lamps, stop lamps (brake lights), rear fog lamps, and reversing lamps. The luminaire may be applied in different types of (automotive) lamps. Such lamps may distract other users, such as e.g. automobilists, less than lamps with a regular pattern of lighting devices, such as a regular pattern of solid state devices.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

The schematic drawings are not necessarily to scale.

The luminaire described herein may be used for indoor lighting and/or outdoor lighting, and especially for lighting of relative large areas. In embodiments, the luminaire may be used for outdoor lighting.

Figure 1A:
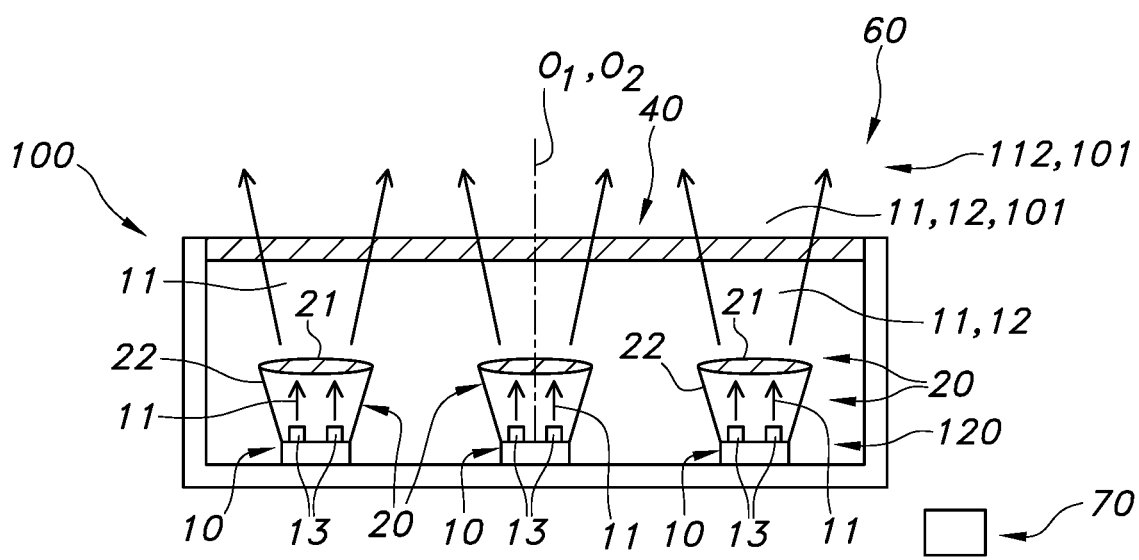
FIGS. 1a-1b schematically depict an embodiment and some variants of a luminaire and elements thereof.

FIG. 1a schematically depicts an embodiment of a luminaire 100. The luminaire 100 comprises a plurality of lighting devices 10 and a plurality of beam shaping optics 20.

Each lighting device 10 is configured to provide lighting device light 11 and each lighting device 10 comprising at least a light source 13. In this schematic drawing only three lighting devices 10 are depicted, each comprising two light sources 13.

As shown, each beam shaping optics 20 is configured to receive lighting device light 11 of one of the lighting devices 10 and is configured to beam shape the lighting device light 11 into a beam 12 of lighting device light 11.

Here, by way of example also a window 40 is depicted, which is of a light transmissive, especially transparent material. Hence, here the outdoor luminaire 100 comprises a light transparent window 40 configured downstream of the plurality of beam shaping optics 20. Therefore, a viewer from external of the luminaire 100 can see the optics 20, and thus also the arrangement 120 of the optics.

The outdoor luminaire 100 is configured to provide a beam 112 of luminaire light 101 comprising the beams 12 of lighting device light 11. Hence, the beam 112 of luminaire light 101 is built up by the beams 12 of the different lighting devices with their associated respective optics 20.

Not visible in this view (but see below), the beam shaping optics 20 are configured in an arrangement 120 which is random, phyllotactic or a combination thereof.

The arrangement 120 in this embodiment is planar, like the window 40 is. However, the window 40 may be curved and/or facetted, and/or the arrangement 120 of the optics may be curved and/or facetted.

Here, by way of example the beam shaping optics 20 comprise lenses 21 and reflectors 22.

The luminaire 100 provides a light emitting area 60, which may essentially be defined by the optics 20. As here in this embodiment there is a light transparent window 40 downstream of the optics 20, the window 40 may define the light emitting area 60.

In embodiments, the luminaire may comprise or may be functionally coupled to a control system 70 configured to control (in a control mode) the lighting devices 10. In this way one or more of the intensity and spectral distribution of the luminaire light 101 may be controlled. Would there be two or more subsets of different optics, providing different beam shapes, then a control system may also be able to control the beam shape of the beam 112 of luminaire light 101.

Figure 1B:
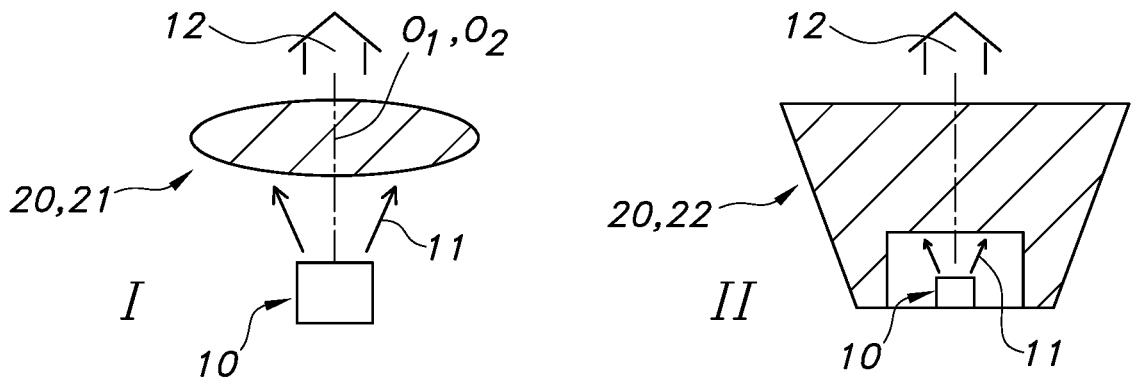
Figure 1B:
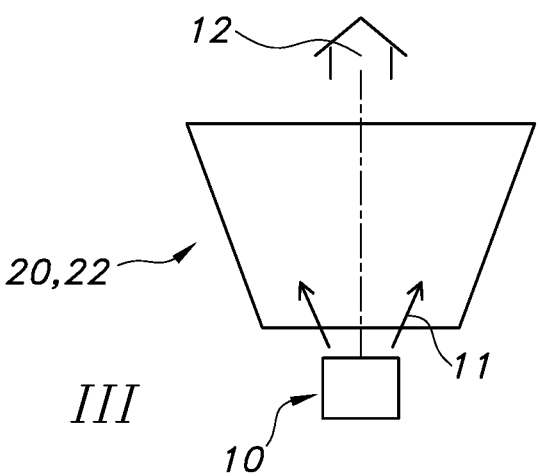

FIG. 1b schematically depicts three embodiments of optics 20, each by way of example together with a lighting device 10. Example I schematically shows an embodiment of a lens 21, example II shows an embodiment of a total internal reflector 22, and example III shows an example of a hollow reflector 22. Reference O1 indicates the optical axis of the lighting device 10 (which may comprise a plurality of light sources, see above), and reference O2 indicates the optical axis of the optics 20. These optical axes are especially configured parallel and point in the same direction. More especially, these optical axes may coincide.

Figure 2A:
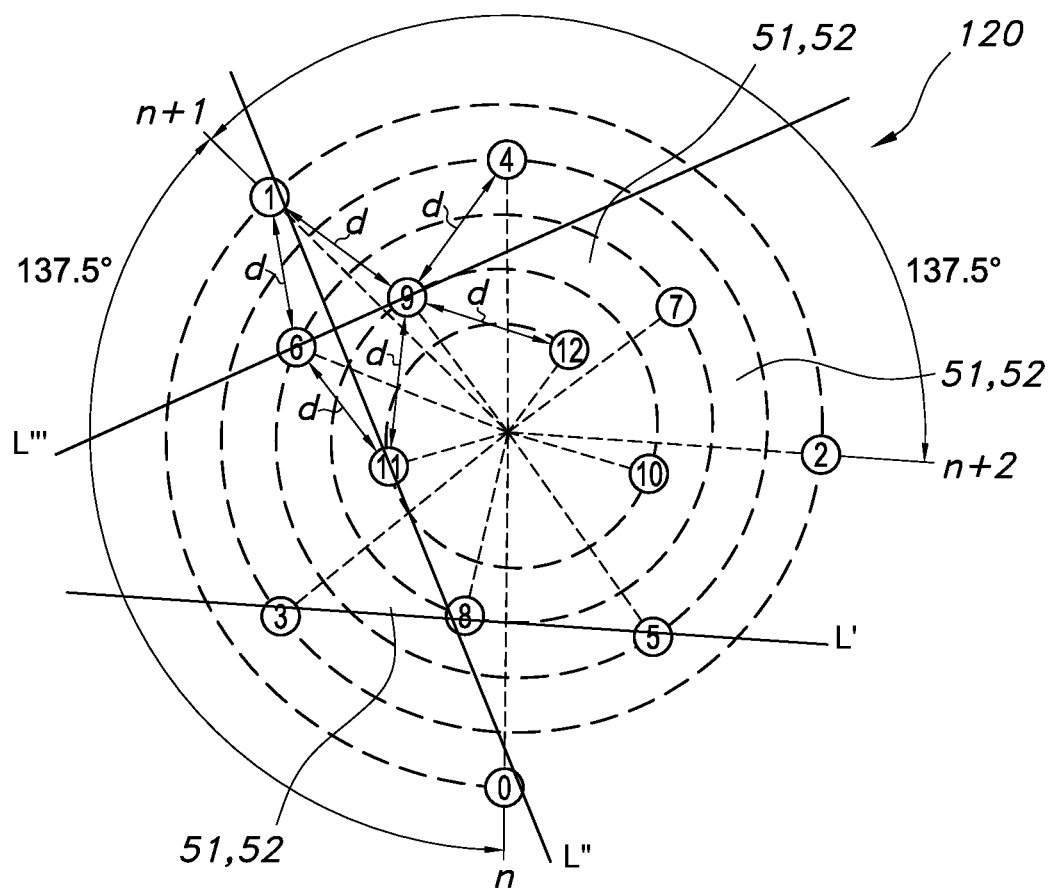
FIGS. 2a-2e schematically depict some embodiments and some variants of a luminaire and elements thereof.
Figure 2B:
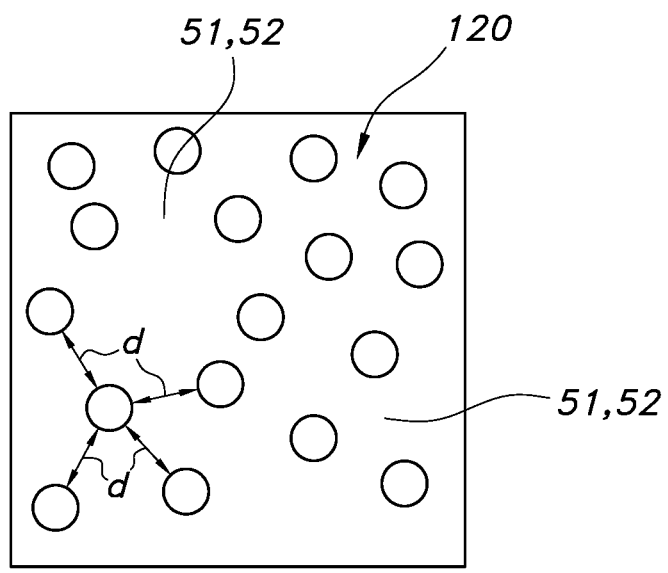

FIG. 2a schematically shows an example of a phyllotactic arrangement 120 (of the light sources or the optics) and FIG. 2b schematically shows an example of a random arrangement 120 (of the light sources or the optics). As shown in the schematic drawings, there are no subsets of adjacent beam shaping optics of more than three beam shaping optics configured in a straight line (along the virtual face). As depicted in FIG. 2a, light sources or optics no. 3, no. 8 and no. 5 are adjacent and arranged on a straight line L'. As depicted in FIG. 2a, light sources or optics no. 0, no. 8, no. 11 and no. 1 are arranged on a straight line L", but are not adjacent. For example, light source or optic no. 6 is adjacent to light sources or optics no. 11 and no. 1. This means that any straight line does not cross more than three adjacent beam shaping optics. This also means that any straight line does not cross more than three adjacent lighting devices. In an embodiment, any straight line does not cross more than two adjacent light sources, see for example line L'''. In an embodiment, any straight line does not cross more than two adjacent beam shaping optics, see for example line L'''. In an embodiment, any straight line does not cross more than three light sources. In an embodiment, any straight line does not cross more than two light sources. In an embodiment, any straight line does not cross more than three beam shaping optics. In an embodiment, any straight line does not cross more than two beam shaping optics. In an embodiment, any straight line does not cross more than three adjacent beam shaping optics in the points representing the centers of the beam shaping optics. In an embodiment, any straight line does not cross more than three adjacent lighting devices in the points representing the centers of the lighting devices. In an embodiment, any straight line does not cross more than three beam shaping optics in the points representing the centers of the beam shaping optics. In an embodiment, any straight line does not cross more than three lighting devices in the points representing the centers of the lighting devices.

These figures also show first interspaces 51 between adjacent lighting devices 10 or second interspaces 52 between adjacent beam shaping optics 20. As these arrangements are schematic representations, these figures may reflect the arrangement of the lighting devices or the arrangement of the optics.

Reference d indicates the interdistance between the lighting devices or the optics. In case of the optics, this interdistance may be essentially 0 mm. In the case of the lighting devices, this interdistance may be about 0.5-5 times, such as 1-2 times the equivalent spherical diameter of the lighting devices, such as of the solid state, or of the COBs. The equivalent spherical diameter (or ESD) of an (irregularly) shaped object is the diameter of a sphere of equivalent volume. The equivalent circular diameter (or ECD) of an irregularly shaped two-dimensional shape is the diameter of a circle of equivalent area. For instance, the equivalent circular diameter of a square with side a is $2*a*SQRT(1/\pi)$.

As shown in FIG. 2a, the phyllotactic arrangement is a kind of spiral-like arrangement with between neighboring elements on the spiral-like arrangement an angle of 137.5°. As known in the art, a small deviation of this angle may already lead to some regularity. Here, the term "element" may thus refer to optics or lighting device.

Figure 2C:
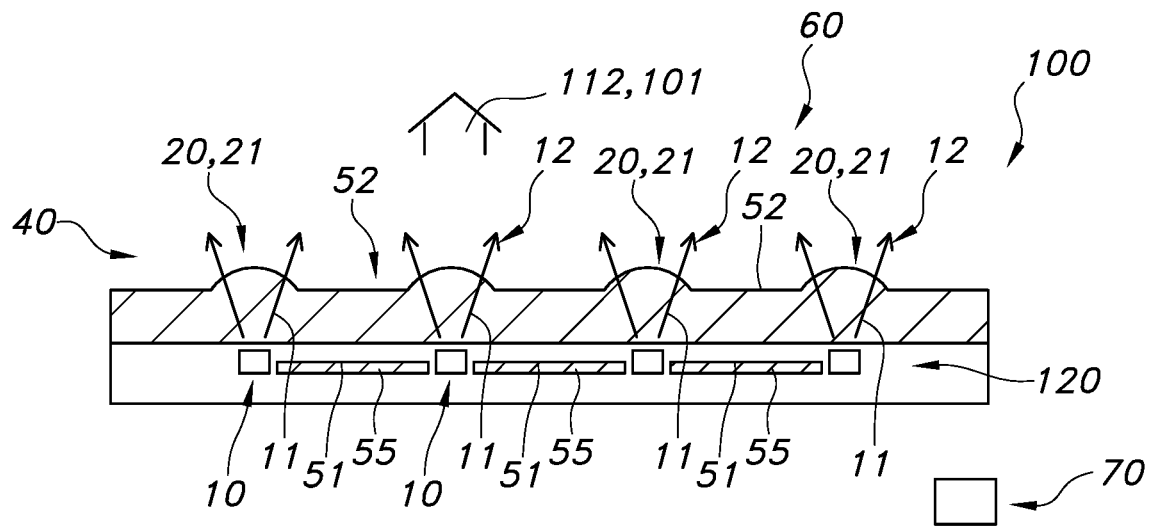

FIG. 2c schematically depicts a further possible embodiment, also comprising a light transparent window 40 configured downstream of the plurality of lighting devices 10. However, here the plurality of beam shaping optics 20 are at least partly comprised by the light transparent window 40.

Further, by way of example, here the embodiments also includes light reflective material 55 configured to reflect visible light in a direction away from the outdoor luminaire 100. For instance, the light reflective material may be Teflon or a alumina or a $BaSO_4$ coating, or other materials known in the art that can reflect light. The reflective material may be available at the first interspaces 51 or the second interspaces 52. Here, the first interspaces comprise reflective material. For instance, a PCB with lighting devices may be provided with a reflective material between the lighting devices.

Figure 2D:
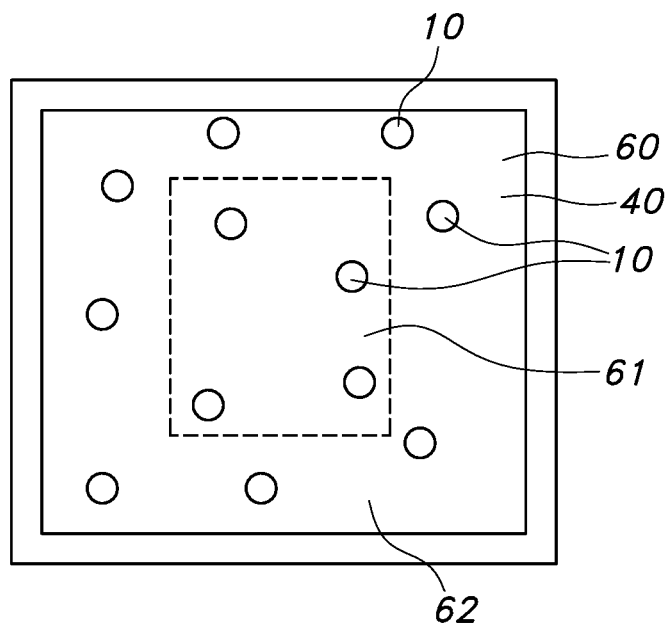

FIG. 2d schematically depicts a light emitting area 60 from which the beam of luminaire light emanates, such as an array of lighting devices, or here the window 40. As indicated above, it appears further desirable that the edges provide less intense light than a central area. For instance, the plurality of lighting devices 10 are configured to provide lighting device light 11 with different intensities, with higher intensities in a central part 61 of the light emitting area 60 and with lower intensities in a peripheral part 62 of the light emitting area. There may also be a gradient between a central part and a plurality of peripheral parts, wherein the latter are arranged at different distances from the central part (like a core-shell structure, with the core being the central part, and one or more shells as peripheral part(s)).

Figure 2E:
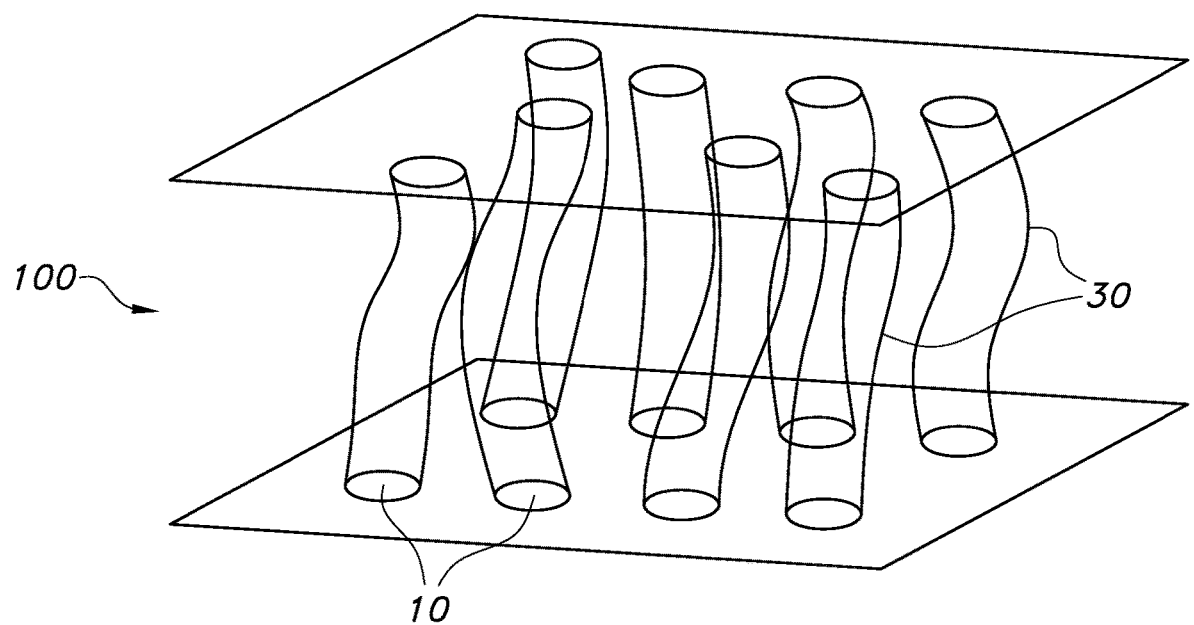

FIG. 2e schematically depicts an embodiment wherein the plurality of lighting devices 10 are configured in an arrangement 120 which may be regular, or otherwise not corresponding with the arrangement of number of optics 20. The luminaire 100 further comprises a plurality of optical fibers 30 for guiding the lighting device light 11 of the lighting devices 10 to the respective beam shaping optics 20.

Figure 3:
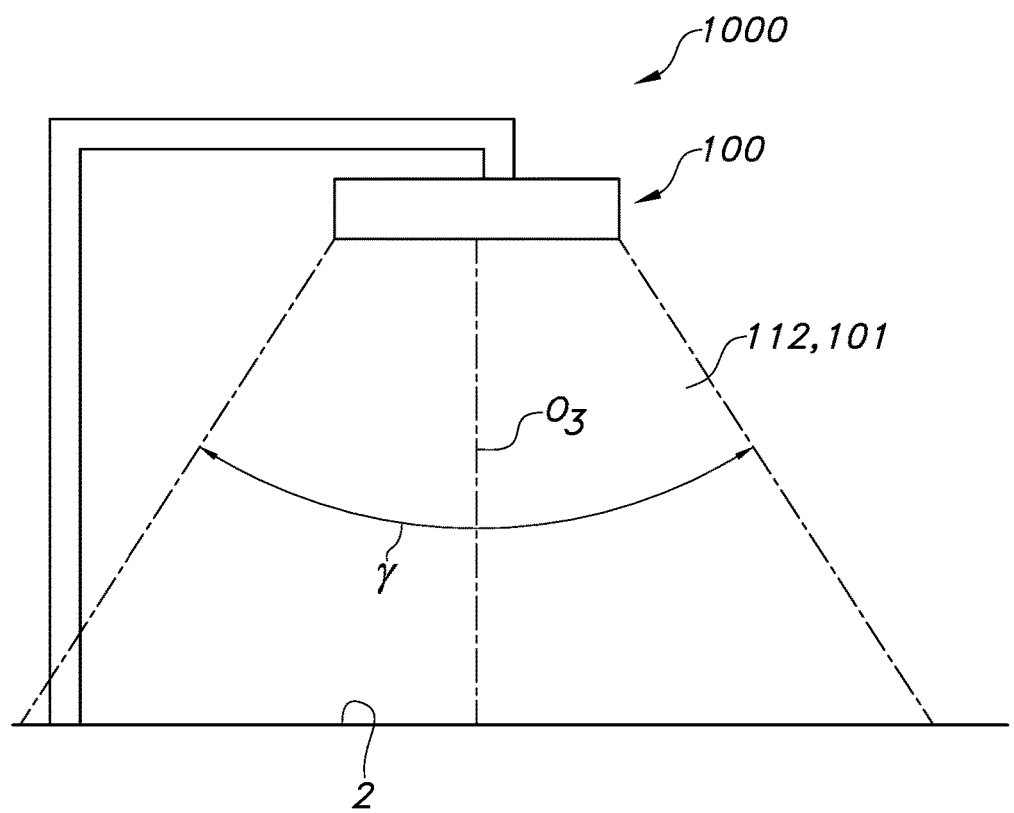
FIG. 3 schematically depicts an embodiment of an arrangement with a luminaire, here by way of example for e.g. street lighting.

FIG. 3 schematically depicts an embodiment wherein the plurality of lighting devices and the plurality of beam shaping optics are configured to provide the beam 112 of luminaire light 101 having a beam angle γ in the range of 90-140° within a cross-sectional plane of the beam 112 of luminaire light 101, which cross-sectional plane of the beam 112 of luminaire light 101 also comprises an optical axis O3 of the outdoor luminaire 100. Especially, at least 75% of the intensity of the luminaire light 101 within this beam angle γ. This angle γ can also be defined as opening angle of the beam 112. This FIG. 3 also schematically depicts an arrangement 1000 of an outdoor luminaire 100 which is configured to illuminate with the beam 112 of luminaire light 101 an area 2 below the luminaire 100. The area 2 may be at least part of a street, etc.

The term "plurality" refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in one embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A luminaire comprising:
    a plurality of lighting devices, each lighting device configured to provide lighting device light and each lighting device comprising at least a light source;
    a plurality of beam shaping optics, each beam shaping optics configured to receive lighting device light of one of the lighting devices and configured to beam shape the lighting device light into a beam of lighting device light;
    wherein the luminaire is configured to provide a beam of luminaire light comprising the beams of lighting device light; and
    wherein the beam shaping optics are configured in an arrangement which is applied in a phyllotactic pattern; wherein any straight line does not cross more than three adjacent beam shaping optics.

2. The luminaire according to claim 1, wherein the beam shaping optics comprise one or more of lenses and reflectors.

3. The luminaire according to claim 1, wherein the plurality of lighting devices are configured in an arrangement which is phyllotactic.

4. The luminaire according to claim 1, wherein the plurality of lighting devices are configured in an arrangement which is regular, wherein the luminaire further comprises a plurality of optical fibers for guiding the lighting device light of the lighting devices to the respective beam shaping optics.

5. The luminaire according to claim 1, further comprising a light transparent window configured downstream of the plurality of beam shaping optics.

6. The luminaire according to claim 1, further comprising a light transparent window configured downstream of the plurality of lighting devices, wherein the plurality of beam shaping optics are at least partly comprised by the light transparent window.

7. The luminaire according to claim 1, further comprising one or more of first interspaces between adjacent lighting devices and second interspaces between adjacent beam shaping optics, wherein the first interspaces or the second interspaces comprise light reflective material configured to reflect visible light in a direction away from the luminaire.

8. The luminaire according to claim 1, defining a light emitting area from which the beam of luminaire light emanates, and wherein the plurality of lighting devices are configured to provide lighting device light with different intensities, with higher intensities in a central part of the light emitting area and with lower intensities in a peripheral part of the light emitting area.

9. The luminaire according to claim 1, defining a light emitting area from which the beam of luminaire light emanates, the luminaire further comprising a control system configured to control in a control mode the lighting devices to provide lighting device light with different intensities, with higher intensities in a central part of the light emitting area and with lower intensities in a peripheral part of the light emitting area.

10. The luminaire according to claim 1, wherein the plurality of lighting devices and the plurality of beam shaping optics are configured to provide the beam of luminaire light having a beam angle ($\gamma$) in the range of 90-140° within a cross-sectional plane of the beam of luminaire light, which cross-sectional plane of the beam of luminaire light also comprises an optical axis (O3) of the luminaire, with at least 75% of the intensity of the luminaire light within this beam angle ($\gamma$).

11. An arrangement of the luminaire according to claim 1, configured to illuminate with the beam of luminaire light an area below the luminaire.

12. Street lamp comprising the arrangement according to claim 11.

13. Vehicle light comprising the luminaire of claim 1.

14. Vehicle rear light assembly comprising the arrangement according to claim 12.

* * * * *